United States Patent
Stehle et al.

(10) Patent No.: US 12,199,423 B2
(45) Date of Patent: Jan. 14, 2025

(54) ASYMMETRIC OVERVOLTAGE PROTECTION APPARATUS, DC CIRCUIT ARRANGEMENT AND DC NETWORK

(71) Applicant: DEHN SE, Neumarkt (DE)

(72) Inventors: Michael Stehle, Neumarkt (DE); Franz Schork, Neumarkt (DE)

(73) Assignee: DEHN SE, Neumarkt i.d.OPt. (DE)

( * ) Notice: Subject to any disclaimer, the term of this patent is extended or adjusted under 35 U.S.C. 154(b) by 608 days.

(21) Appl. No.: 17/607,195

(22) PCT Filed: May 4, 2020

(86) PCT No.: PCT/EP2020/062282
§ 371 (c)(1),
(2) Date: Oct. 28, 2021

(87) PCT Pub. No.: WO2020/221933
PCT Pub. Date: Nov. 5, 2020

(65) Prior Publication Data
US 2022/0224110 A1     Jul. 14, 2022

(30) Foreign Application Priority Data

May 2, 2019     (DE) .......................... 102019111378.4

(51) Int. Cl.
*H02H 9/06*       (2006.01)
*H02H 7/122*      (2006.01)

(52) U.S. Cl.
CPC .............. *H02H 9/06* (2013.01); *H02H 7/122* (2013.01)

(58) Field of Classification Search
CPC .......... H02H 9/04; H02H 9/001; H02H 9/041; H02H 9/025; H02H 3/202; H02H 3/093; H02H 3/22; H02H 3/162; H02J 3/381
See application file for complete search history.

(56) References Cited

U.S. PATENT DOCUMENTS

| 5,243,488 A | 9/1993 | Bernier et al. ................... 361/56 |
| 5,285,344 A | 2/1994 | Heitzmann ..................... 361/22 |

(Continued)

FOREIGN PATENT DOCUMENTS

| CN | 109643892 A | 4/2019 | ............... H02H 9/04 |
| DE | 4039404 A1 | 6/1992 | ........... B60R 16/033 |

(Continued)

OTHER PUBLICATIONS

EP 2701256 B1 Translation (Year: 2016).*

(Continued)

*Primary Examiner* — Bryan R Perez
(74) *Attorney, Agent, or Firm* — Bodner & Bodner, PLLC; Christian P. Bodner; Gerald T. Bodner (57) ABSTRACT

An asymmetric surge protection device for a DC circuit (16) has a negative side (32) which can be connected to a current output (28) of the DC circuit (16), a positive side (30) which can be connected to a current input (26) of the DC circuit (16), and an asymmetric neutral section (34). The asymmetric neutral section (34) has a positive protection level ($V_p$) for a positive voltage (V) between the positive side (30) and the negative side (32), and a negative protection level ($V_n$) for a negative voltage (V) between the positive side (30) and the negative side (32), the positive protection level ($V_p$) being different from the negative protection level ($V_n$). Furthermore, a DC circuit arrangement (14) and a DC network (10) are shown.

19 Claims, 5 Drawing Sheets

(56) References Cited

U.S. PATENT DOCUMENTS

| | | | |
|---|---|---|---|
| 10,998,719 B2 | 5/2021 | To et al. | |
| 11,296,497 B2 | 4/2022 | Cai et al. | |
| 2008/0170342 A1 | 7/2008 | Osamura | 361/56 |
| 2011/0134675 A1 | 6/2011 | Grbovic | 363/127 |
| 2011/0211290 A1* | 9/2011 | Fife | H02H 9/04 |
| | | | 361/118 |
| 2015/0116874 A1 | 4/2015 | Jean Charles et al. | 361/56 |
| 2017/0019526 A1 | 1/2017 | Simonnet et al. | |
| 2017/0047733 A1 | 2/2017 | Buchanan | |
| 2018/0076706 A1 | 3/2018 | Betzin et al. | |
| 2018/0278050 A1 | 9/2018 | Rabier | |

FOREIGN PATENT DOCUMENTS

| | | | | |
|---|---|---|---|---|
| DE | 202015102462 U1 | 6/2015 | | H02H 11/00 |
| DE | 102015203269 A1 | 8/2016 | | H02H 9/04 |
| DE | 102017201863 A1 | 8/2018 | | H02K 11/049 |
| EP | 0490079 A2 | 6/1992 | | B60R 16/033 |
| EP | 0490787 A1 | 6/1992 | | G01R 19/165 |
| EP | 2701256 B1 * | 12/2016 | | H02H 3/025 |
| JP | S548847 A | 1/1979 | | H02H 9/02 |
| JP | S54120847 A | 9/1979 | | H02H 3/20 |
| JP | H06245372 A | 9/1994 | | H02H 9/04 |
| WO | WO2006050568 A1 | 5/2006 | | H02H 9/02 |
| WO | WO2018121278 A1 | 7/2018 | | H02H 9/04 |

OTHER PUBLICATIONS

Notification Concerning Transmittal of International Preliminary Report on Patentability (Chapter I of the Patent Cooperation Treaty), in English, dated Nov. 11, 2021, which was issued by the International Bureau of WIPO in Applicant's corresponding international PCT application having Serial No. PCT/EP2020/062282, filed on May 4, 2020.

English translation of the International Preliminary Report on Patentability (Chapter I of the Patent Cooperation Treaty), dated Nov. 2, 2021, which was issued by the International Bureau of WIPO in Applicant's corresponding international PCT application having Serial No. PCT/EP2020/062282, filed on May 4, 2020.

Written Opinion of the International Searching Authority, in English, dated Aug. 25, 2020, which was issued by the International Bureau of WIPO in Applicant's corresponding international PCT application having Serial No. PCT/EP2020/062282, filed on May 4, 2020.

International Search Report, in English, dated Aug. 25, 2020, which was issued by the International Bureau of WIPO in Applicant's corresponding international PCT application having Serial No. PCT/EP2020/062282, filed on May 4, 2020.

* cited by examiner

ASYMMETRIC OVERVOLTAGE PROTECTION APPARATUS, DC CIRCUIT ARRANGEMENT AND DC NETWORK

The invention relates to an asymmetric surge protection device, a DC circuit arrangement and a DC network.

Surge protection for power networks or loads is necessary to prevent damage to the loads or circuits in exceptional cases, such as lightning strikes.

For DC circuits and DC connections or electronic devices for DC networks, no effective surge protection exists, especially if the DC circuit or the device has no reverse polarity protection, such as a reverse polarity protection diode.

It is therefore the object of the invention to provide a surge protection device, a DC circuit arrangement, and a DC network in which damage due to overvoltages can be effectively prevented.

The object is achieved by an asymmetric surge protection device for a DC circuit having a current input and a current output, comprising a negative side which can be connected to the current output of the DC circuit, a positive side which can be connected to the current input of the DC circuit, and an asymmetric neutral section. The asymmetric neutral section has a positive protection level for a positive voltage between the positive side and the negative side, and a negative protection level for a negative voltage between the positive side and the negative side, the positive protection level being different from the negative protection level.

As the positive protection level and the negative protection level are different, the surge protection can be configured to be asymmetric. In this way, positive and negative overvoltages can be handled separately, as a result of which the asymmetry of the DC circuit or the electrical device and thus the asymmetric sensitivity to overvoltages are taken into account.

The negative protection level may be less than the negative freewheeling voltage of the DC circuit.

For example, the DC circuit has no reverse polarity protection.

The positive side is also called "DC plus" or "L+" for unipolar direct current. Correspondingly, the negative side is also called "DC minus" or "L−" for unipolar direct current.

For example, the neutral section includes a discharging component, and the surge protection device includes a drive for the neutral section, the drive being configured so as to release the discharging component accordingly when the voltage between the positive side and the negative side is positive and the magnitude of the voltage is above the positive protection level, or when the voltage is negative and the magnitude of the voltage is above the negative protection level. The drive makes it possible to flexibly adjust the protection levels.

The discharging component is in particular capable of withstanding pulse currents.

To realize a reliable surge protection device, the discharging component may comprise a spark gap, a gas discharge tube, a varistor, a thyristor, an IGBT and/or a MOSFET, and/or the drive may comprise at least one diode, an IGBT, a thyristor and/or a MOSFET.

In one embodiment, the neutral section has a positively discharging branch for reducing a positive voltage and a negatively discharging branch for reducing a negative voltage, in particular wherein the branches are parallel. In this way, the structure of the neutral section can be realized by means of simple components.

For an efficient discharge, the positively discharging branch has a first passive discharging component, in particular a varistor, a spark gap and/or a gas discharge tube.

The positively discharging branch may be completely passive. The discharging component is in particular capable of withstanding pulse currents.

For example, the breakdown voltage or threshold voltage of the positively discharging component is the positive protection level.

In one configuration, the negatively discharging branch includes a switchable component, and the surge protection device includes a drive for the switchable component, in particular wherein the switchable component is an IGBT (insulated-gate bipolar transistor), a thyristor, or a MOSFET (metal-oxide-semiconductor field-effect transistor). The drive is configured to switch the switchable component accordingly when the voltage between the positive side and the negative side is negative and the magnitude of the voltage is above the negative protection level. In this way, the negative protection level can be flexibly adjusted.

For example, the negatively discharging branch only includes the switchable component. However, it is also conceivable that the negatively discharging branch comprises a further component such as a spark gap, a gas discharge tube and/or a varistor.

In one configuration, the negatively discharging branch comprises at least one second passive discharging component, in particular wherein the negatively discharging branch is completely passive, as a result of which the surge protection device can be configured in a particularly simple way. The second passive discharging component is, for example, capable of withstanding pulse currents.

The forward voltage or the threshold voltage of the second passive discharging component for the negative voltage may be the negative protection level. In particular, the breakdown voltage for the positive voltage is greater than the positive protection level.

For example, the entire neutral section has no active or switching components.

To further simplify the surge protection device, the at least one second passive discharging component may be a diode, or the second passive discharging component may be a plurality of series-connected diodes.

In particular, the diode or diodes have their cathode connected to the positive side and their anode(s) connected to the negative side.

In a further embodiment of the invention, the neutral section has at least one unipolar transient-voltage suppression diode which has its cathode connected to the positive side and its anode connected to the negative side, in particular wherein the neutral section has a plurality of parallel-connected unipolar transient-voltage suppression diodes. In this way, the neutral section can be implemented with a single component or with few components.

For example, the forward voltage of the transient-voltage suppression diode(s) is the negative protection level, and the breakdown voltage is the positive protection level.

In one variant embodiment, the positive protection level is greater than 100 V, in particular greater than 400 V, and/or the negative protection level is less than 100 V, the DC circuit being thus reliably protected.

The voltage data refer to the magnitude of the voltage.

To protect high-power DC circuits, the DC circuit may be a converter, in particular an inverter or a DC voltage converter.

The object is further achieved by a DC circuit arrangement comprising a DC circuit, in particular a converter, such as an inverter or a DC voltage converter, and an asymmetric surge protection device as previously described. The DC circuit has a current input and a current output, and the positive side of the surge protection device is electrically connected to the current input, and the negative side of the surge protection device is electrically connected to the current output.

The features and advantages discussed as to the surge protection device apply equally to the DC circuit arrangement and vice versa.

In particular, the DC circuit has no reverse polarity protection.

To be able to reliably protect the DC circuit, the DC circuit arrangement may have a DC terminal, the surge protection device being arranged between the DC terminal and the DC circuit.

The object is further achieved by a DC network comprising a DC circuit arrangement as previously described and a DC source having a positive pole and a negative pole. The positive pole is electrically connected to the positive side of the surge protection device, and the negative pole is electrically connected to the negative side of the surge protection device.

The features and advantages discussed as to the surge protection device and the DC circuit arrangement apply equally to the DC network and vice versa.

For example, the DC network is a DC network in a building.

The surge protection device is for example arranged between the DC source and the DC circuit to reliably protect the DC circuit.

Further features and advantages of the invention will become apparent from the description below and from the accompanying drawings, to which reference is made and in which:

FIG. 6b shows a block diagram of a possible configuration of the surge protection device according to FIG. 6a.

Figure 1:
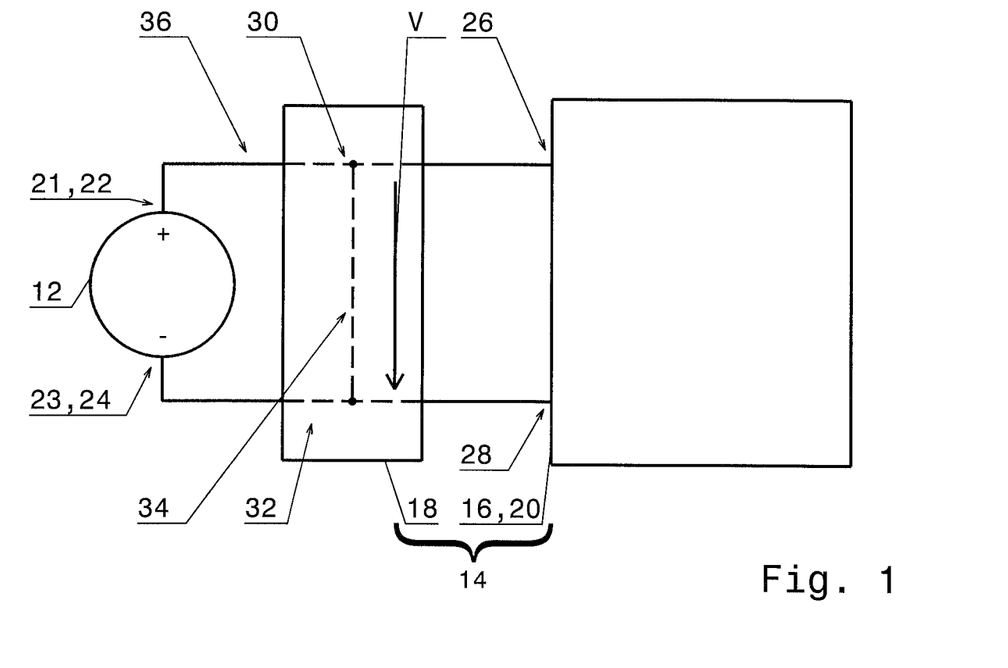
FIG. 1 shows a block diagram of a DC network according to the invention with a DC circuit arrangement according to the invention which comprises an asymmetric surge protection device according to the invention.

FIG. 1 shows a DC network 10 with a DC source 12 and a DC circuit arrangement 14 comprising a DC circuit 16 and an asymmetric surge protection device 18 according to the invention.

The DC network 10 is, for example, a DC network of a building, of a charging infrastructure for electric vehicles, or any other DC network. For example, the DC network 10 is unipolar.

The DC circuit 16 may be a converter 20, or it may be any other DC circuit, such as a load.

The DC source 12 may be any DC source, which in the context of the present invention also includes connections to a higher-level network. Accordingly, the DC source 12 has a first pole 21, in the described case of a unipolar DC source 12 the positive pole 22, and a second pole 23, in this case the negative pole 24. For the sake of simplicity, reference will be made below only to a positive pole 22 and a negative pole 24, although this of course also generally means the first pole 21 and the second pole 23.

The DC circuit 16 is operated by means of the current of the DC source 12 and accordingly includes a current input 26 and a current output 28.

In particular, the DC circuit 16 has no reverse polarity protection.

The surge protection device 18 has a positive side 30, a negative side 32, and a neutral section 34.

Within the surge protection device 18, the positive side 30 and the negative side 32 are connected to each other by means of the neutral section 34.

The positive side 30 and the negative side 32 are each formed by a line electrically connecting the positive pole 22 of the DC source 12 to the current input 26 of the DC circuit 16, and the current output 28 of the DC circuit 16 to the negative pole 24 of the DC source 12, respectively.

Thus, the surge protection device 18 is arranged between the DC source 12 and the DC circuit 16.

In other words, the DC circuit arrangement 14 has a DC terminal 36 connected to the DC source 12. The surge protection device 18 is arranged between the DC terminal 36 and the DC circuit 16.

It is also conceivable that the terminals of the positive side 30 or the negative side 32 facing the DC source 12 form the DC terminal 36 of the DC circuit arrangement 14.

During regular operation of the DC network 10, the DC source 12 provides a positive voltage.

As a result, the positive side 30 of the surge protection device 18 is at a higher potential than the negative side 32, so that the voltage V between the positive side 30 and the negative side 32 is positive. In the context of the present invention, this is referred to as a positive voltage in this case.

In exceptional cases, the negative side 32 may be at a higher potential than the positive side 30. This situation may occur, for example, in case of a lightning strike in the DC network 10. In this case, the voltage V is negative, and this is referred to as a negative voltage in the context of the present invention.

The neutral section 34 is now configured to provide two different protection levels, namely a positive protection level $V_p$ and a negative protection level $V_n$.

"Different" in this case means different magnitudes.

The positive protection level $V_p$ relates to positive voltages V, and the negative protection level $V_n$ relates to negative voltages V.

This means that positive voltages V above the positive protection level $V_p$ and negative voltages V the magnitude of which is greater than the negative protection level $V_n$ are reduced through the neutral section 34.

In other words, the positive protection level $V_p$ and the negative protection level $V_n$ define the operating range of the DC circuit 16 by: $-V_n < V < V_p$.

For example, the positive protection level $V_p$ is greater than 100 V, for example 400 V, and the negative protection level $V_n$ is less than 100 V, for example 80 V, resulting in a safe operating range of −80 V to 400 V. It is of course also conceivable that the positive protection level $V_p$ is greater than 400 V and the negative protection level $V_n$ is less than 80 V.

In this way, the DC circuit 16 is reliably protected from current pulses with both positive voltage and negative voltage, taking the different sensitivities of the DC circuit 16 to negative and positive voltage into account.

FIGS. 2 to 5 illustrate and describe further embodiments of the DC network 10, the DC circuit arrangement 14 and the surge protection device 18, respectively, which are substantially the same as the first embodiment according to FIG. 1. Therefore, only the differences will be discussed below, and identical and functionally identical parts are provided with the same reference signs.

Figure 2:
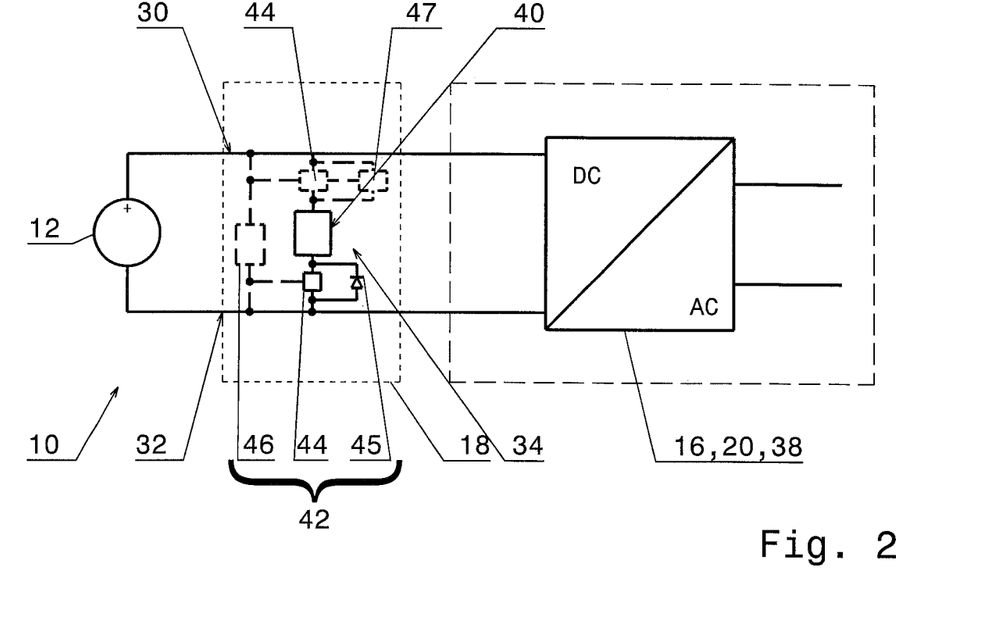
FIG. 2 shows a block diagram of a second embodiment of a surge protection device according to the invention, of a DC circuit arrangement according to the invention and of a network according to the invention.

In the embodiment according to FIG. 2, the DC circuit 16 is an inverter 38.

In this embodiment, the neutral section 34 has a discharging component 40 and a drive 42 for the discharging component 40.

The discharging component 40 is capable of withstanding current pulses, particularly with a symmetrical protection level for positive and negative voltages. For example, the discharging component 40 is a gas discharge tube, a spark gap, or a varistor.

Drives 42 for discharging components 40 are sufficiently known.

In the second example embodiment shown, the drive 42 includes a switching element 44, a diode 45, and a control unit 46 arranged to control the switching element 44.

The discharging component 40 is directly connected to the positive side 30 and, by means of the switching element 44 and the diode 45, to the negative side 32. The diode 45 and the switching element 44 are arranged in parallel.

The diode 45 has its anode connected to the negative side 32 and its cathode connected to the discharging component 40.

The switching element 44 is, for example, an IGBT (insulated-gate bipolar transistor), a thyristor and/or a MOSFET (metal-oxide-semiconductor field-effect transistor).

The control unit 46 is connected to the switching element 44, for example to the gate electrode of the switching element 44, for control, and to the positive side 30 and the negative side 32 for measuring the voltage V.

During operation, the control unit 46 measures the voltage V continuously or at regular intervals. If the voltage V measured by the control unit 46 is positive and its magnitude is above the positive protection level $V_p$, the control unit 46 switches the switching element 44 to reduce the voltage V via the discharging component 40.

The positive protection level $V_p$ is thus stored in the control unit 46 as a threshold value and can be adapted to the DC circuit 16.

The negative protection level $V_n$ is provided by the forward voltage of the diode 45. When the voltage V is negative and the magnitude of the voltage V is above the negative protection level $V_n$, the diode 45 becomes conductive and releases the discharging component 40. The negative voltage is then reduced through the diode 45 and the discharging component 40.

It is of course possible that the switching element 44 and the diode 45 are arranged between the discharging component 40 and the positive side 30, as shown in dashed lines in FIG. 2.

It is also conceivable that instead of the diode 45, a further switching element 47 is used, which is switched by the control unit 46. The further switching element 47 can be designed like the switching element 44 but be antiparallel. In this case, the control unit 46 switches the further switching element 47 to reduce the voltage V via the discharging component 40 when the voltage V measured by the control unit 46 is negative and its magnitude is above the negative protection level $V_n$. Thus, both the positive and negative protection levels $V_p$, $V_n$ may be stored as threshold values in the control unit 46.

Figure 3:
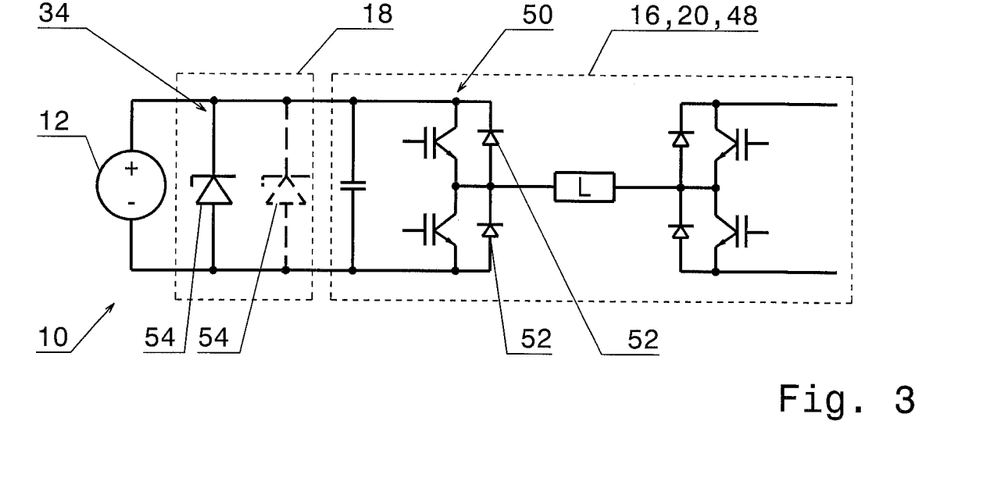
FIG. 3 shows a block diagram of a third embodiment of a surge protection device according to the invention, of a DC circuit arrangement according to the invention and of a network according to the invention.

In the third embodiment shown in FIG. 3, the DC circuit 16 is a DC voltage converter 48 which is shown schematically.

In the third example embodiment shown, the DC voltage converter 48 has a half-bridge circuit 50 having two substrate or freewheeling diodes 52 which define a freewheeling voltage $V_F$ of the DC voltage converter 48 and of the DC circuit 16, respectively.

Similarly, the DC circuits 16 have all of the example embodiments shown, or all of the DC circuits 16 have a freewheeling voltage $V_F$. A negative voltage with a magnitude greater than the freewheeling voltage $V_F$ will cause damage to the DC circuit 16, especially at high voltages.

Therefore, the negative voltage level $V_n$ is always selected to be smaller than the freewheeling voltage $V_F$.

In the third embodiment according to FIG. 3, the neutral section 34 has a unipolar transient-voltage suppression diode 54 the cathode of which is connected to the positive side 30 and the anode of which is connected to the negative side 32.

It is also conceivable that a plurality of unipolar transient-voltage suppression diodes 54 are connected in parallel, as indicated by the illustration in dashed lines in FIG. 3.

The forward voltage of the unipolar transient-voltage suppression diode 54 represents the negative protection level $V_n$, and the breakdown voltage of the unipolar transient-voltage suppression diode 54 represents the positive protection level $V_p$. Thus, in this third embodiment, the neutral section 34 is entirely passive as no switching or active components are required. In particular, the neutral section 34 includes only one or more unipolar transient-voltage suppression diodes 54.

Figure 4:
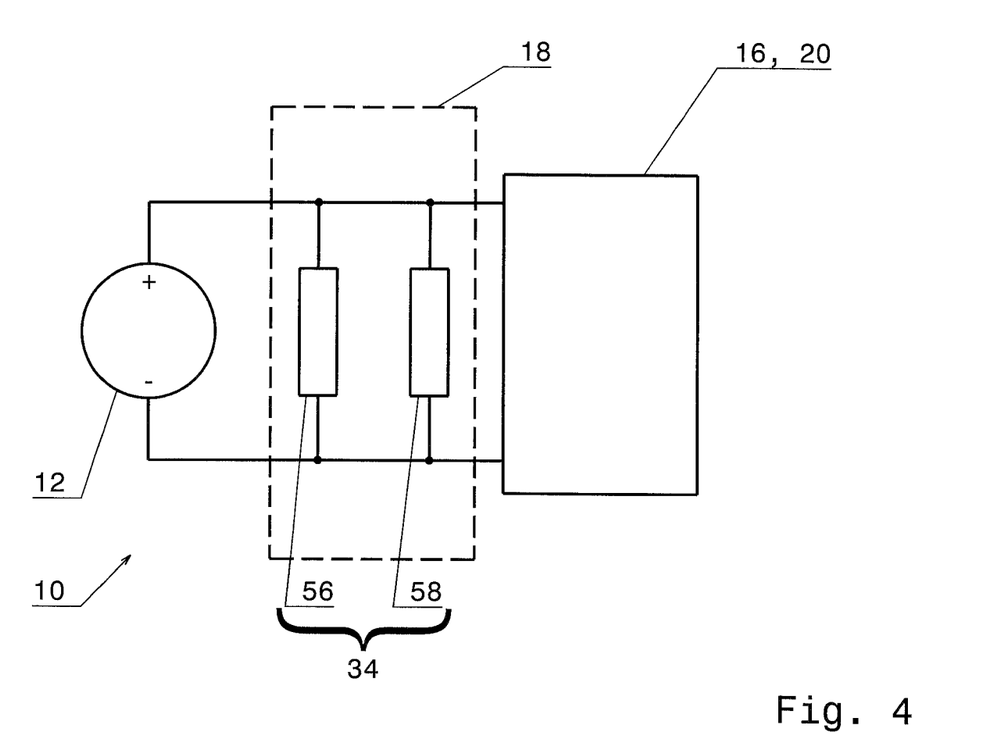
FIG. 4 shows a block diagram of a fourth embodiment of a surge protection device according to the invention, of a DC circuit arrangement according to the invention and of a network according to the invention.

In the fourth embodiment shown in FIG. 4, the neutral section 34 has two parallel branches, namely a positively discharging branch 56 and a negatively discharging branch 58.

The positively discharging branch 56 serves to discharge the voltage V if the voltage V is positive, and the negatively discharging branch 58 serves to discharge the voltage V if the voltage V is negative.

For example, in the fourth embodiment, the positively discharging branch 56 has only a first passive discharging component 60 which is capable of withstanding current pulses and has a high breakdown voltage which forms the positive protection level $V_p$. The breakdown voltage of the first passive discharging component 60 or the positively discharging branch 56 may also be symmetrical.

The negatively discharging branch 58 is configured to be asymmetric. This means that the breakdown voltage of the negatively discharging branch 58 for positive voltages is above the breakdown voltage of the positively discharging branch 56. However, the forward voltage for negative voltages of the negatively discharging branch 58 is significantly smaller and represents the protection level $V_n$.

The forward voltage for negative voltages, and hence the negative protection level $V_n$, is less than the freewheeling voltage $V_F$ of the DC circuit 16 and is also less than the symmetrical breakdown voltage of the positively discharging branch 56.

Figure 5A:
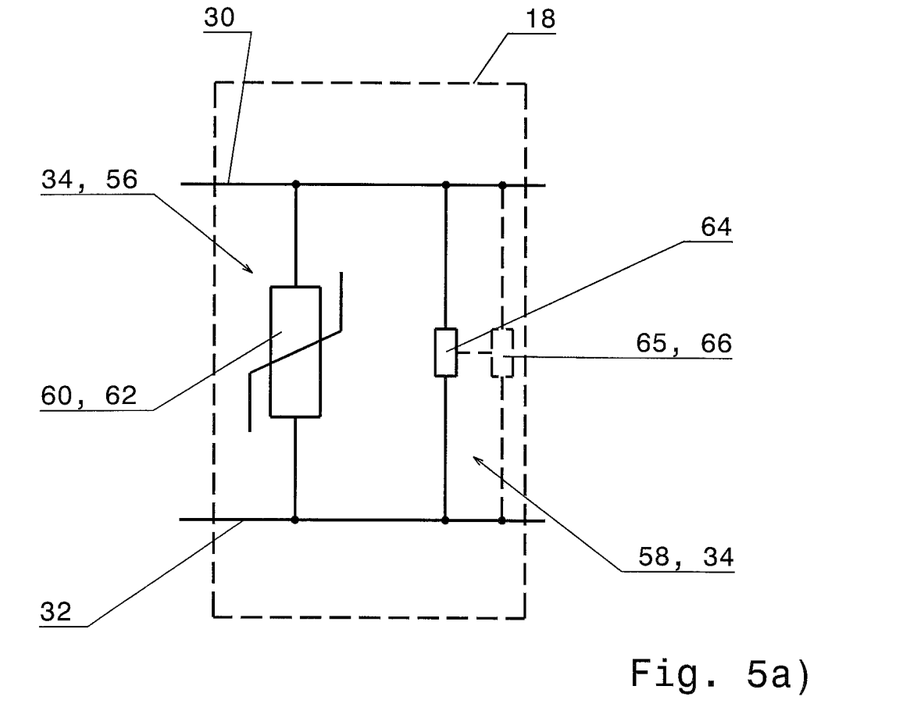
FIGS. 5a to 5c show various embodiments of a surge protection device according to the invention as shown in FIG. 4 in a block diagram.
Figure 5B:
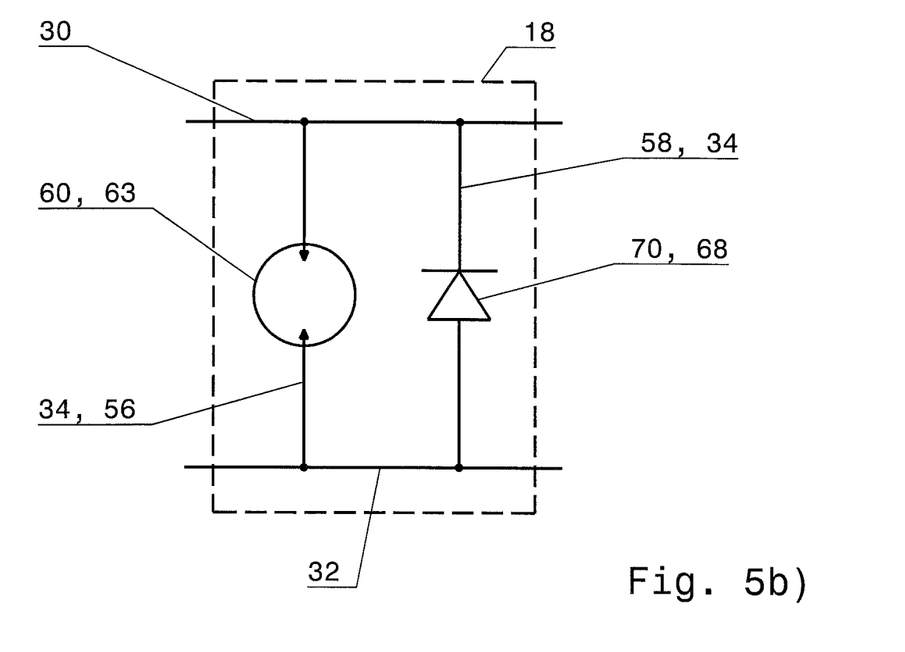
Figure 5C:
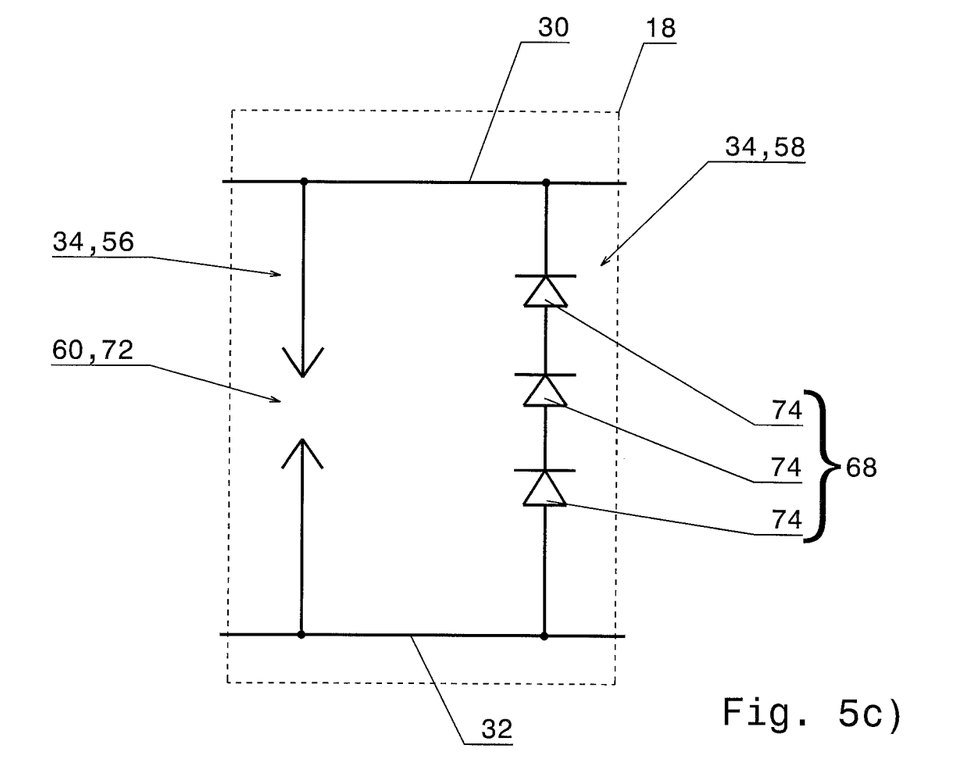

FIGS. 5*a*, 5*b* and 5*c* show various configurations of the discharging branches 56, 58, the combinations of configurations of the discharging branches 56, 58 being merely exemplary.

The discharging branches 56, 58 may of course be combined in any combination to form the neutral section 34.

In the example embodiment shown in FIG. 5*a*, the first passive discharging component 60 is a varistor 62.

In this example embodiment, the negatively discharging branch 58 includes a switchable component 64, and the surge protection device 18 includes a control unit 66 which forms a drive 65 for the switchable component 64.

The switchable component 64 has a high breakdown voltage for positive voltages and is in particular capable of withstanding current pulses. In particular, the negatively discharging branch 58 includes only the switchable component 64.

The switchable component 64 is, for example, an IGBT, a thyristor, or a MOSFET.

Similar to the drive 42, the control unit 66 is connected to the positive side 30, the negative side 32, and also to the switchable component 64 for control.

The control unit 66 measures the voltage V continuously or at regular intervals, and as soon as the voltage V is negative and above the negative protection level $V_n$ in terms of magnitude, the control unit 66 switches the switchable component 64 so that the voltage V is reduced via the negatively discharging branch 58.

In the embodiment shown in FIG. 5*b*, the first passive discharging component 60 is a gas discharge tube 63.

In this embodiment, the negatively discharging branch 58 does not have a switchable component 64, but is completely passive. Thus, the negatively discharging branch 58 has a second passive discharging component 68. Thus, the entire neutral section 34 is passive.

The second passive discharging component 68 is also capable of withstanding pulse currents.

Here, the numeral word "second" is used to differentiate from the first passive discharging component 60. The use does not imply that the negatively discharging branch 58 also includes a first passive discharging component.

In the example embodiment shown in FIG. 5*b*, the second passive discharging component 68 is a diode 70 having its cathode connected to the positive side 30 and its anode connected to the negative side 32.

In the example embodiment of FIG. 5*c*, which is substantially the same as the example embodiment of FIG. 5*b*, the first passive discharging component 60 is a spark gap 72.

In this embodiment, the second passive discharging component 68 includes a plurality of series-connected diodes 74.

Though three diodes 74 are shown in FIG. 5*c*, any number of diodes 74 can of course be used to achieve the desired breakdown voltage and/or forward voltage.

Figure 6A:
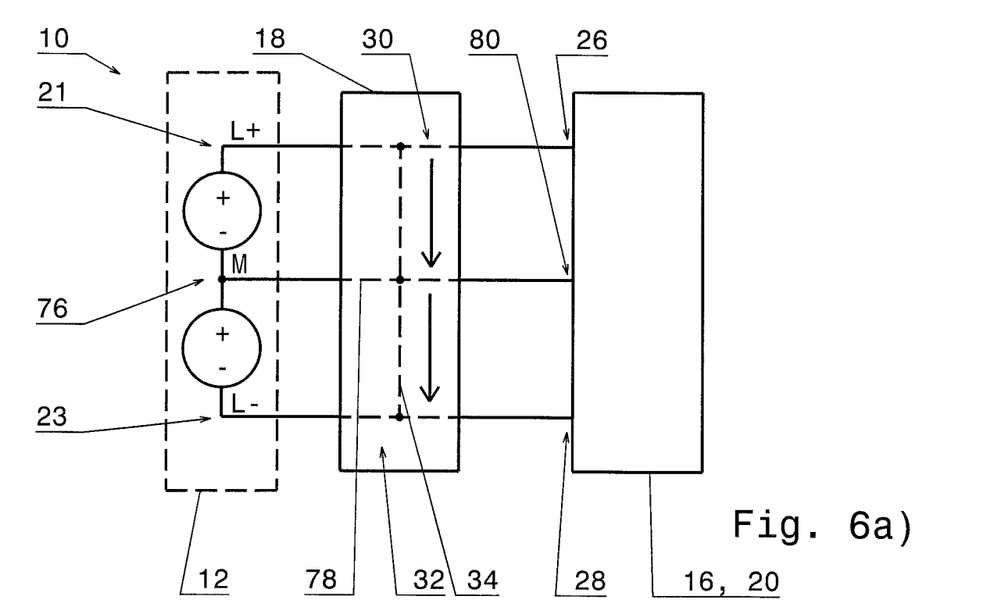
FIG. 6a shows a block diagram of a fifth embodiment of a surge protection device according to the invention, of a DC circuit arrangement according to the invention and of a network according to the invention.
Figure 6B:
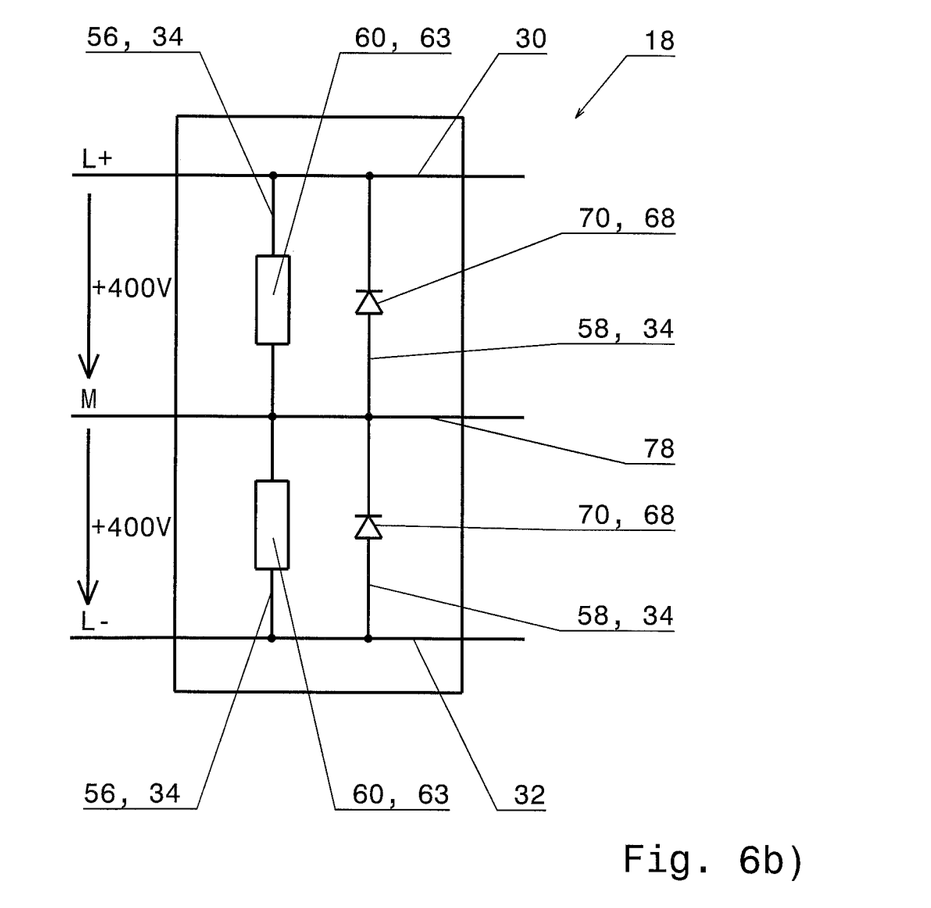

FIGS. 6*a* and 6*b* show a fifth embodiment. In this fifth embodiment, the DC network 10 is not a unipolar DC network but a multipolar DC network, in this case a bipolar DC network.

Accordingly, the DC source 12 in this embodiment is also a multipolar DC source 12, in this case a bipolar DC source.

Similarly, the other components of the DC network 10 are also configured to be multipolar, in particular the DC circuit arrangement 14, the DC circuit 16 and the surge protection device 18.

The mode of operation will be described below with reference to a bipolar DC network, but can of course be extended to DC networks having more than three poles.

In addition to the first pole 21 and the second pole 23, the DC source 12 has a third pole 76. For example, the first pole 21 is referred to as L+, the second pole is referred to as L−, and the third pole 76 is referred to as M. The third pole 76 may also be referred to as the common zero pole.

The regular operating voltage between the first pole 21 and the third pole 76 may be 400 V and may also be 400 V between the third pole 76 and the second pole 23 (see FIG. 6*b*). The first pole 21 and the second pole 23 then have a potential difference of 800 V.

Accordingly, the DC circuit 16 has three current inputs or current outputs 26, 27, 80.

In this embodiment, the surge protection device 18 has two neutral sections 34 and three sides, namely a third side 78 in addition to the positive side 30 and the negative side 32.

The first neutral section 34 is provided between the positive side 30 and the third side 78, and the second neutral section 34 is provided between the negative side 32 and the third side 78.

The neutral sections 34 of this fifth embodiment may be formed in accordance with the previous embodiments.

In the example shown in FIG. 6*b*, the neutral sections 34 correspond to the neutral section of the embodiment of FIG. 5*b*. However, all other embodiments are also conceivable.

Accordingly, the mode operation of the neutral sections 34 of the fifth embodiment is also the same as that of the neutral section 34 of the preceding embodiments. For the first neutral section 34, the third side 78 corresponds to the negative side of the previous embodiments, and for the second neutral section 34, the third side 78 corresponds to the positive side.

In this way, DC circuits 16 can be reliably protected even in multipolar DC networks 10.

The invention claimed is:

1. An asymmetric surge protection device for a DC circuit having a current input and a current output, comprising a negative side which can be connected to the current output of the DC circuit, a positive side which can be connected to the current input of the DC circuit, and an asymmetric neutral section, the asymmetric neutral section having a positive protection level $V_p$ for a positive voltage between the positive side and the negative side, and a negative protection level $V_n$ for a negative voltage between the positive side and the negative side, the positive protection level $V_p$ being different from the negative protection level $V_n$, and wherein the neutral section has a positively discharging branch for reducing a positive voltage and a negatively discharging branch for reducing a negative voltage.

2. The surge protection device according to claim 1, wherein the positively discharging branch and the negatively discharging branch are parallel.

3. The surge protection device according to claim 1, wherein the positively discharging branch comprises a first passive discharging component.

4. The surge protection device according to claim 3, wherein the first passive discharging component is a varistor, a spark gap and/or a gas discharge tube.

5. The surge protection device according to claim 4, wherein the positively discharging branch is completely passive.

6. The surge protection device according to claim 1, wherein the negatively discharging branch has a switchable component and the surge protection device has a drive for the switchable component, wherein the drive is configured so as to switch the switchable component accordingly when the voltage between the positive side and the negative side is negative and the magnitude of the voltage is above the negative protection level $V_n$.

7. The surge protection device according to claim 6, wherein the switchable component is an IGBT, a thyristor or a MOSFET.

8. The surge protection device according to claim 1, wherein the negatively discharging branch includes at least one second passive discharging component.

9. The surge protection device according to claim 8, wherein the at least one second passive discharging component is a diode or in that the second passive discharging component comprises a plurality of series-connected diodes.

10. The surge protection device according to claim 8, wherein the negatively discharging branch is completely passive.

11. The surge protection device according to claim 1, wherein the positive protection level $V_p$ is greater than 100 V and/or the negative protection level $V_n$ is less than 100 V.

12. The surge protection device according to claim 11, wherein the positive protection level $V_p$ is greater than 400 V.

13. The surge protection device according to claim 1, wherein the DC circuit is a converter.

14. The surge protection device according to claim 13, wherein the DC circuit is an inverter or a DC voltage converter.

15. The surge protection device according to claim 1, wherein the surge protection device has at least one third side and at least two neutral sections, each connecting two of the sides of the surge protection device to each other.

16. An asymmetric surge protection device for a DC circuit having a current input and a current output, comprising a negative side which can be connected to the current output of the DC circuit, a positive side which can be connected to the current input of the DC circuit, and an asymmetric neutral section, the asymmetric neutral section having a positive protection level $V_p$ for a positive voltage between the positive side and the negative side, and a negative protection level $V_n$ for a negative voltage between the positive side and the negative side, the positive protection level $V_p$ being different from the negative protection level $V_n$,
wherein the neutral section has a discharging component and the surge protection device has a drive for the neutral section, the drive being configured so as to correspondingly release the discharging component when the voltage between the positive side and the negative side is positive and the value of the voltage is above the positive protection level $V_p$, or when the voltage is negative and the magnitude of the voltage is above the negative protection level $V_n$.

17. The surge protection device according to claim 16, wherein the discharging component includes a spark gap, a gas discharge tube and/or a varistor and/or in that the drive includes at least one diode, an IGBT, a thyristor and/or a MOSFET.

18. An asymmetric surge protection device for a DC circuit having a current input and a current output, comprising a negative side which can be connected to the current output of the DC circuit, a positive side which can be connected to the current input of the DC circuit, and an asymmetric neutral section, the asymmetric neutral section having a positive protection level $V_p$ for a positive voltage between the positive side and the negative side, and a negative protection level $V_n$ for a negative voltage between the positive side and the negative side, the positive protection level $V_p$ being different from the negative protection level $V_n$,
wherein the neutral section has at least one unipolar transient-voltage suppression diode, which has its cathode connected to the positive side and its anode connected to the negative side.

19. The surge protection device according to claim 18, wherein the neutral section has a plurality of parallel-connected unipolar transient-voltage suppression diodes.

* * * * *